United States Patent
Li et al.

(10) Patent No.: US 9,998,608 B2
(45) Date of Patent: Jun. 12, 2018

(54) METHOD, USER EQUIPMENT AND CHARGING SYSTEM FOR CHARGING PROXIMITY BASED SERVICES

(71) Applicant: Alcatel Lucent, Boulogne-Billancourt (FR)

(72) Inventors: Xiangyang Li, Shanghai (CN); Yigang Cai, Naperville, IL (US)

(73) Assignee: Alcatel Lucent, Boulogne-Billancourt (FR)

( * ) Notice: Subject to any disclaimer, the term of this patent is extended or adjusted under 35 U.S.C. 154(b) by 0 days. days.

(21) Appl. No.: 15/509,645

(22) PCT Filed: Sep. 4, 2015

(86) PCT No.: PCT/IB2015/001883
§ 371 (c)(1),
(2) Date: Mar. 8, 2017

(87) PCT Pub. No.: WO2016/038452
PCT Pub. Date: Mar. 17, 2016

(65) Prior Publication Data
US 2017/0289361 A1    Oct. 5, 2017

(30) Foreign Application Priority Data

Sep. 12, 2014    (CN) .......................... 2014 1 0465120

(51) Int. Cl.
| | |
|---|---|
| *H04M 15/00* | (2006.01) |
| *H04W 4/24* | (2018.01) |
| *H04M 15/28* | (2006.01) |
| *H04M 15/30* | (2006.01) |

(52) U.S. Cl.
CPC .......... *H04M 15/64* (2013.01); *H04M 15/28* (2013.01); *H04M 15/30* (2013.01); *H04M 15/43* (2013.01); *H04M 15/65* (2013.01); *H04M 15/93* (2013.01); *H04W 4/24* (2013.01)

(58) Field of Classification Search
CPC ..... H04M 15/93; H04M 15/64; H04W 4/008; H04W 4/24; H04W 8/005; H04L 12/14; H04L 12/1428
See application file for complete search history.

(56) References Cited

U.S. PATENT DOCUMENTS

| | | | | |
|---|---|---|---|---|
| 2007/0103117 | A1* | 5/2007 | Burghardt | ............... H04L 12/14 320/119 |
| 2011/0238547 | A1* | 9/2011 | Belling | .................. G06Q 30/04 705/34 |
| 2014/0134974 | A1 | 5/2014 | Kuo | |

FOREIGN PATENT DOCUMENTS

| | | |
|---|---|---|
| WO | WO-2006/016332 A1 | 2/2006 |
| WO | WO-2014/044326 A2 | 3/2014 |
| WO | WO-2014/106829 A1 | 7/2014 |

OTHER PUBLICATIONS

International Search Report PCT/ISA/210 for International Application No. PCT/IB2015/001883 dated Feb. 3, 2016.

* cited by examiner

*Primary Examiner* — Nizar Sivji
(74) *Attorney, Agent, or Firm* — Harness, Dickey & Pierce, P.L.C.

(57) ABSTRACT

The method includes obtaining charging related information of a proximity based service used by user equipment; generating a charging request for the proximity based service used by the user equipment based on the charging related information; and transmitting the charging request to a charging system of the wireless communication network.

14 Claims, 3 Drawing Sheets

METHOD, USER EQUIPMENT AND CHARGING SYSTEM FOR CHARGING PROXIMITY BASED SERVICES

CROSS-REFERENCE TO RELATED APPLICATIONS

This application is the U.S. National Phase application of PCT Application No. PCT/IB2015/001883 filed on Sep. 4, 2015, which claims priority to Chinese Patent Application No. 201410465120.9 filed on Sep. 12, 2014 the entire contents of each of which are incorporated herein by reference.

FIELD OF THE INVENTION

The present invention relates to the field of wireless communication, and more specifically, to a method, a user equipment and a charging system for charging a proximity based service in wireless communication.

BACKGROUND OF THE INVENTION

ProSe (Proximity based Services) is a new technology in LTE-A; when mobile devices are proximate to each other, they may connect and communicate directly using ProSe. ProSe enables communication between mobile devices to occur directly between mobile devices, without via a wireless access network and a core network, thereby offloading traffic load of the wireless access network and the core network. Further, because ProSe is based on the LIE technology and works at an LTE licensed frequency band, such that it is a part of the wires communication, it may provide a higher communication quality than technologies such as Bluetooth, WiFi Direct. It should be noted that when the mobile device moves beyond the coverage of an LTE network, it can still use ProSe on the licensed frequency band based on the LIE technology.

At present, the standard organization is still in an initial stage in the study on ProSe, and a detailed solution for charging Prose has not been formed yet. Because a direct device-to-device communication may be performed immediately without network interference after a connection is established between mobile devices using ProSe, even the mobile devices using ProSe might not be in the network coverage of wireless communication, it is an imminent problem to solve how to charge ProSe.

SUMMARY OF THE INVENTION

An objective of the present invention is to provide a method, user equipment for charging a proximity based service (ProSe) in a user equipment of a wireless communication network, and a charging system for a proximity service in a wireless communication network.

According to one aspect of the present invention, there is provided a method for charging a proximity based service in a user equipment of a wireless communication network, comprising:

obtaining charging related information of a proximity based service used by the user equipment;
generating a charging request for the proximity based service used by the user equipment based on the charging related information;
transmitting the charging request to a charging system of the wireless communication network.

According to another aspect of the present invention, there is provided a user equipment for charging a proximity based service in a user equipment of a wireless communication network, comprising:

means for obtaining charging related information of a proximity based service used by the user equipment;
means for generating a charging request for the proximity based service used by the user equipment based on the charging related information;
means for transmitting the charging request to a charging system of the wireless communication network.

According to a further aspect of the present invention, there is provided a charging system for a proximity based service in a wireless communication network, comprising:

a network device configured to generate a proximity based service used by a user equipment in the wireless communication network and transmitting a charging request;
a user equipment supporting anyone of above methods to generate and transmit a charging request for the proximity based service used by the user equipment;
a charging device for charging based on the charging request.

Compared with the prior art, the solution provided according to the present invention enables generation, on a user equipment, of a charging request for a proximity based service used by a user equipment, and transmission of the charging request to a wireless communication network when the user equipment has a connection to the wireless communication network.

Compared with the prior art, in which charging can only be performed to a proximity based service used by a user equipment connected to the wireless communication network, the solution of the present invention can charge a proximity service used by a user equipment having or not having a connection to the wireless communication network, thereby forming a more effective charging solution.

BRIEF DESCRIPTION OF THE DRAWINGS

Other features, objectives and advantages of the present invention will become more apparent through reading the following detailed description of the non-limiting embodiments with reference to the following accompanying drawings.

Same or similar reference numerals in the accompanying drawings represent same or similar components.

DETAILED DESCRIPTION OF THE INVENTION

Hereinafter, the present invention will be described in further detail with reference to the accompanying drawings.

The wireless communication herein includes a communication manner performed through radio signals based on a 3GPP protocol, e.g., LTE, wherein the wireless communication network includes a communication network based on a 3GPP protocol, e.g., LTE, and generally, a plurality of base stations, each base station providing a wireless coverage of the cell where it is located. The base station includes, but not limited to, NodeB, eNodeB. Besides, the wireless communication network supports a plurality of user equipments. Each user equipment may move within or between different cells, or move out of the coverage of the wireless communication network. When the user equipment is in a wireless coverage of a base station, it may communicate with the base station and then communicates with the wireless communication network. Besides, the user equipment may also indirectly establish an IP connection with a corresponding entity of the wireless communication network through other relaying node, thereby communicating with the wireless communication network. Here, the user equipment may be any electronic device that may communicate with a base station directly or indirectly in a wireless manner, including, but not limited to, a mobile phone, a PDA, etc. Preferably, each user equipment and base station in the wireless communication network may transmit and receive information in a time-division duplexing mode (TDD mode) and transmit and receive information in a frequency-division duplexing mode (FDD mode). Those skilled in the art should understand that the wireless communication technology and the modes in which each user equipment and base station transmit and receive information are not limited to the above, and any other existing or future possibly emerging wireless communication technology and information transceiving modes, if applicable to the present invention, should also be included within the protection scope of the present invention, and are incorporated here by reference.

Figure 1:
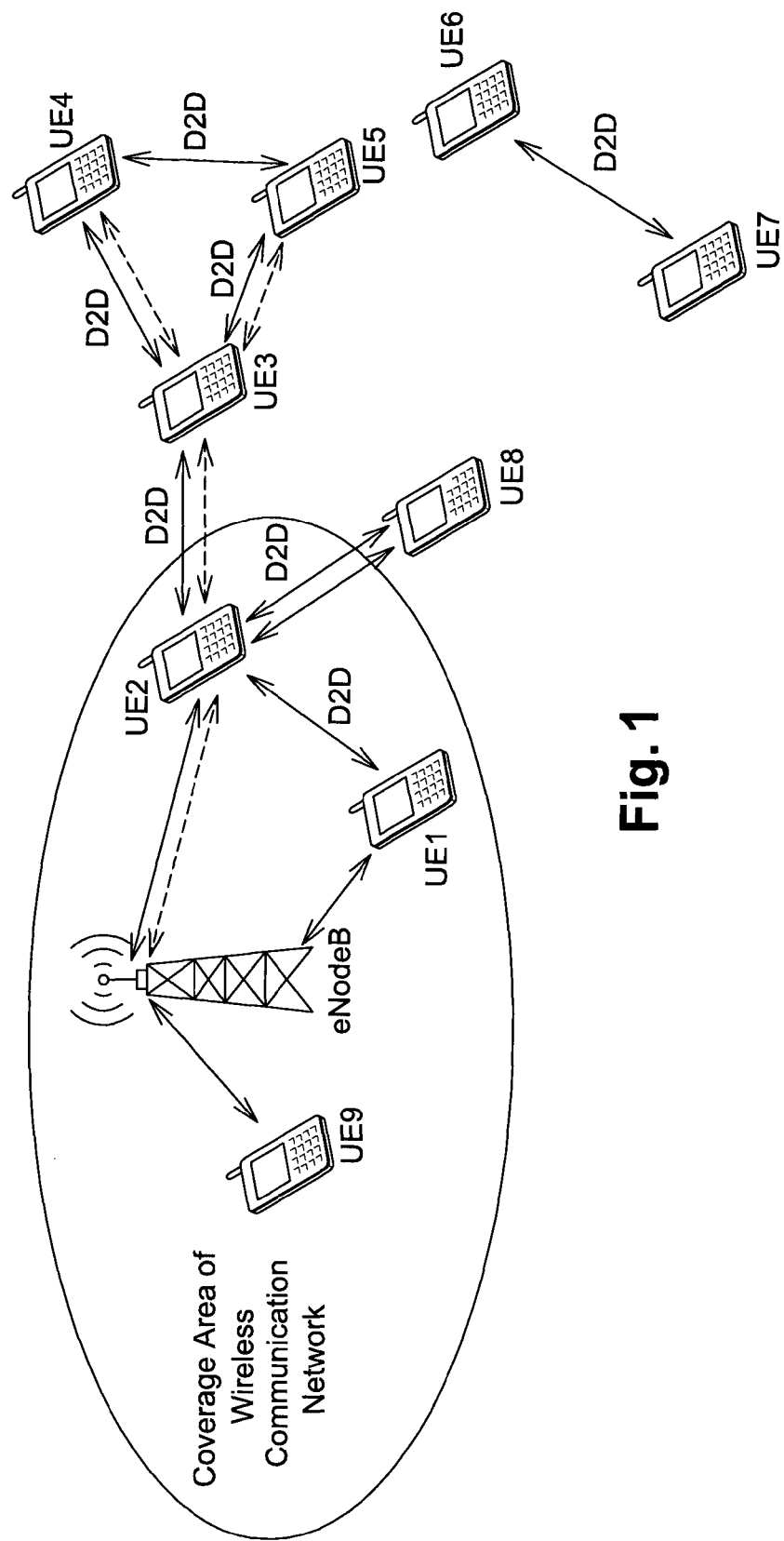
FIG. 1 shows a schematic diagram of a proximity based service in a wireless communication network.

FIG. 1 shows a schematic diagram of a proximity based service in a wireless communication network. As shown in the figure, within the coverage of the wireless communication network, and beyond the coverage, there are distributed a plurality of user equipments (UEs), wherein UE1, UE2 and UE9 are located within the coverage of the wireless communication network and have a connection to the base station eNodeB. While UE3-UE8 are all located beyond the coverage of the wireless communication network. Device-to-device (D2D) communication may be performed using a proximity based service between respective proximate user equipments in FIG. 1. In FIG. 1, a connection marked with D2D indicates that a proximity based service is used between user equipments, and there is a D2D direct connection therebetween. For example, there is a D2D connection between UE1 and UE2, between UE2 and UE3, among UE3, UE4 and UE5, and between UE6 and UE7.

Besides, use of proximity based services between user equipment may be divided into the following four types according to the connection condition between the user equipments and the wireless communication network:

1. Both of two user equipments in communication are located within the coverage of the wireless communication network, e.g., the proximity based service communication between UE1 and UE2;

2. Only one of two user equipments in communication is located within the coverage of the wireless communication network, for example, the proximity based service communication between UE2 and UE8;

3. Neither of two user equipments in communication is located within the coverage of the wireless communication network, but one or two of the user equipments may establish a connection with another user equipment located in the coverage of the wireless communication network, which may be used as a relaying node to connect to the wireless communication network, e.g., the proximity based service communication between UE3 and UE4 or between UE3 and UE5, wherein UE3 uses UE2 as a relaying node to connect to the wireless communication network; or, in another case, neither of the two user equipments in communication is located within the coverage of the wireless communication network, but one or two of the user equipments may establish an IP connection (not shown) with a relevant entity of the wireless communication network through a relay manner such as WLAN;

4. Neither of two user equipments in communication is located within a coverage of the wireless communication network, and neither of the two user equipments can establish a connection with the wireless communication network via a relaying node, e.g., the proximity based service communication between UE6 and UE7.

Among the above four types of proximity based service communications, for the first to third type, the wireless communication network may control the proximity service communication of the user equipment through a direct (first type) or relayed (second type, third type) connection. The relayed control link is shown in dotted-line in FIG. 1. However, for the fourth type of proximity based service communication, the wireless communication network cannot control it.

Correspondingly, for the first to third types of proximity based service communications, the user equipment may transmit charging related information to the wireless communication network directly or via a relaying node when performing proximity based service communication. However, for the fourth type of proximity based service communication, the user equipment will not be able to transmit the charging related information to the wireless communication network when performing proximity based service communication. At this point, the user equipment may store the charging related information of the proximity service it uses, and transmits the charging related information of the proximity service stored thereby to the wireless communication network when the user equipment can be connected to the wireless communication network directly or via the relaying node, wherein the charging related information may also comprise one or more pieces of charging related information of one or more times of proximity services.

It should be noted that in this description, the charging related information contains various information which can be used for charging proximity based services.

In the prior art, a charging trigger function (CTF) generally obtains the charging related information and generates a charging request to the charging system. The CTF is generally located in a network device. When the user equipment uses a service, the CTF will generate a charging request while the user equipment uses the service for example via monitoring the signaling message and traffic. However, since the proximity based service is directly performed between user equipments and as mentioned above, the wireless communication network might not be able to control the proximity based service; therefore, the existing CTF technology cannot generate a charging request for such kind of proximity based services. Therefore, based on the solution of the present invention, a charging request may be generated, on the user equipment, for the proximity based service used thereby and transmitted to the charging system, to form a more effective charging solution for the proximity based service.

Hereinafter, for the sake of simplicity, relevant function implemented on the user equipment herein is called UE-CTF. Those skilled in the art should understand, although it is named "CTF," it is only for the purpose of facilitating understanding, rather than any limitation to the application scope of the present invention.

It should be noted that in one embodiment, UE-CTF operates in a safe-mode. UE-CTF can only be accessed and controlled by the service provider of the user equipment, and UE-CTF is able to block any trial of access, operate or control of any method of function of said UE-CTF from other than the service provider of the user equipment. Furthermore, UE-CTF as one of the functions in the user equipment can be totally transparent to a user, and any method or function of UE-CTF cannot be directly or indirectly accessed, operated or controlled by any user, or by any other function or component on that user equipment.

Figure 2:
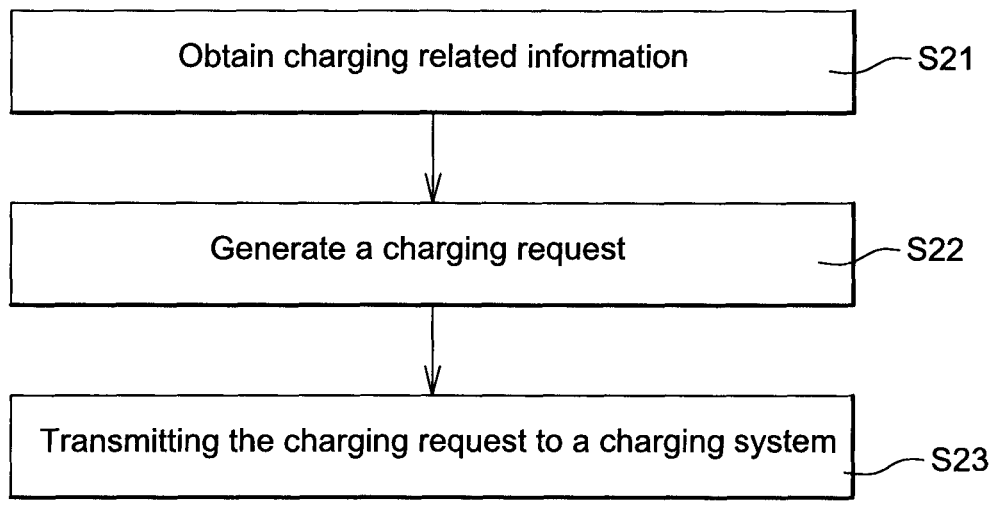
FIG. 2 shows a flow diagram of a method for charging a proximity based service in a user equipment of a wireless communication network according to embodiments in one aspect of the present invention.

FIG. 2 shows a flow diagram of a method for charging a proximity based service in a user equipment of a wireless communication network according to embodiments in one aspect of the present invention.

In step S21, the UE-CTF obtains charging related information of a proximity based service used by a user equipment. Specifically, since the UE-CTF is located at the user equipment, when the user equipment uses the proximity based service, the UE-CTF may obtain corresponding charging related information through interaction with various relevant functions on the user equipment. Here, the UE-CTF may obtain the charging related information at the start of the proximity based service or during the proximity based service or at the end of the proximity based service.

In one embodiment, the UE-CTF determines whether it is needed to obtain charging related information of the proximity based service used by the user equipment, obtains the charging related information of the proximity based service used by the user equipment and only when it is determined to be needed.

For example, in the wireless communication network, besides the user equipment has the UE-CTF thereon, the network device also has a CTF that is available for generating a charging request to the proximity based service. Since such case should be avoided that the UE-CTF and the CTF both generate a charging request for the charging related information, which would cause computational error, the UE-CTF needs to determine whether the charging related information of the proximity based service used by the user equipment should be obtained so as to generate the charging request.

In one embodiment, the UE-CTF determines whether to obtain the charging related information of the proximity based service used by the user equipment based on a network connection state and/or access type from the user equipment to the wireless communication network. For example, when the user equipment does not have a connection to the wireless communication network, the UE-CTF determines to obtain the corresponding charging related information; otherwise, the UE-CTF determines not to obtain the corresponding charging related information. In another embodiment, when the user equipment accesses the wireless communication network via a relaying node, the UE-CTF determines to obtain the corresponding charging related information; when the user equipment is located within the coverage of the wireless communication network so as to have a direct connection to the wireless communication network, the UE-CTF determines not to obtain the corresponding charging related information. In another embodiment, the UE-CTF queries a predetermined condition and determines whether to obtain the corresponding charging related information based on the predetermined condition. For example, the predetermined condition may be that the corresponding charging related information is always obtained by the UE-CTF. Here, the predetermined condition may be dynamically adjusted according to the actual needs.

In another embodiment, the UE-CTF determines whether to obtain the charging related information of a proximity based service used by the user equipment based on a service type and/or application type of the proximity based service. Here, the service type of the proximity based service includes an event type and a session type, and the session type includes a voice call session type and an application data flow session type. The application type refers to a type of the application using the proximity based service. For example, the UE-CTF determines to obtain the corresponding charging related information only when the service type of the proximity based service is a session type. For another example, the UE-CTF determines to obtain the corresponding charging related information only when the service type of the proximity based service is a session type, and the type of the application using the proximity based service is a non-public safety type.

In another embodiment, the UE-CTF determines whether to obtain the charging related information of the proximity based service used by the user equipment based on control information from the wireless communication network. For example, as mentioned above, in one embodiment, in the wireless communication network, besides the user equipment has the UE-CTF thereon, the network device also has a CTF that may be used to generate a charging request for the proximity based service. Usually, the UE-CTF and CTF should not generate a charging request simultaneously for the identical charging related information of the same proximity based service. When the user equipment and the wireless communication network have a direct connection or a connection via relay therebetween, the wireless communication network may determine it should be the UE-CTF or the CTF that performs charging processing to the proximity based service of the user equipment, and transmits corresponding control information to the CTF and the UE-CTF of the user equipment. Based on the control information from the wireless communication network, the UE-CTF can determine whether it should obtain the charging related information of the proximity based service used by the user equipment to generate a charging request.

Those skilled in the art should understand, here, the above manner in which the UE-CTF determines whether it is needed to obtain the charging related information of the proximity based service used by the user equipment is only exemplary, rather than limitative; any manner suitable for the present invention should also be included within the protection scope of the present invention and is incorporated here by reference. Moreover, those skilled in the art should understand that the UE-CTF here needs to determine to obtain corresponding charging related information is not only limited to the scenario where the wireless communication network further exists a CTF. The above method may be applicable to any scenario where the UE-CTF needs to perform the above determining.

Next, in step S22, the UE-CTF generates a charging request for the proximity service used by the user equipment based on the charging related information. As mentioned above, the charging related information may contain the charging related information obtained at the start of the proximity based service, may also contain the charging related information obtained during the proximity based service, and may also contain the charging related information obtained at the end of the proximity based service. The UE-CTF may extract or generate necessary charging parameters from the obtained charging related information and include the corresponding charging parameters in the generated charging request. Here, the charging request may include one or more of the following:

a charging identifier indicating a charged entity;
information indicating that the charging request is generated by the user equipment;
a sequence number indicating a sequence of the charging request;
the charging related information.

Here, the charging identifier indicating a charged entity refers to information that may indicate a charged entity to which the charging request targets, e.g., it may be the information of a user account or an application. The information indicating that the charging request is generated by the user equipment means the UE-CTF may add the information into the charging request to indicate that the charging request is generated by the user equipment, i.e., the UE-CTF. When both the UE-CTF and the CTF exist simultaneously in the wireless communication network, the indication information may distinguish the charging request generated by the UE-CTF and the charging request generated by the CTF. The sequence number for indicating a sequence of the charging request refers to, for example, for a charged session using the proximity based service, as mentioned above, the charging related information obtained by the UE-CTF may include the charging related information obtained at the start of the session, during the session, and at the end of the session, such that the UE-CTF will correspondingly generate one or more charging requests. The UE-CTF uses the sequence number for indicating a sequence of a charging request to indicate the sequence of the generated charging request, such that after the charging request is transmitted to the charging system, the charging system may confirm the sequence of the charging request based on the sequence number, thereby avoiding charging error caused by inconsistency between the sequence of receiving the charging request and the sequence of transmitting due to for example network reason. Besides, the UE-CTF may also include the charging related information into the generated charging request.

Then, in step S23, the UE-CTF transmits the charging request to the charging system of the wireless communication network. When the UE-CTF and the wireless communication network have a direct connection or a connection via relay therebetween, the UE-CTF transmits the charging request to the charging system of the wireless communication network via the connection. Besides, the UE-CTF may also store the charging request. For example, when the user equipment temporarily does not have a connection with the wireless communication network, the UE-CTF stores the charging request on the user equipment. When a direct connection or a connection via relay is established between the user equipment and the wireless communication network, the UE-CTF sends the stored charging request to the charging system of the wireless communication network. In other words, the UE-CTF may determine the time of transmitting the charging request to the charging system based on the network connection state from the user equipment to the wireless communication network.

Besides, in one embodiment, the UE-CTF may also determine the time of transmitting the charging request to the charging system based on a first time threshold. For example, when the network is jammed, the UE-CTF may transmit the charging request to the charging system after waiting for a time indicated by the first time threshold. Here, the first time threshold may be a value preset based on empirical value and the like, or it could be range, such that the UE-CTF may determine the desired time for waiting within this range for example according to a random principle. Besides, the first time threshold may also be passively adjusted according to the actual needs. Those skilled in the art should understand that, here, the manner of setting the first time threshold and determining the time of transmitting the charging request is only exemplary, not limitative, and any manner suitable for the present invention should also be included within the protection scope of the present invention and is incorporated here by reference.

In one embodiment, the UE-CTF determines the charging mode of the proximity based service, generates a charging request for the proximity based service used by the user equipment based on the charging related information and the charging mode, and then transmits the charging request to the offline charging system or online charging system of the wireless communication network based on the charging mode.

Specifically, the UE-CTF first determines the charging mode of the proximity based service. Here, the charging mode includes an offline charging mode and an online charging mode. For example, when the user equipment and the wireless communication network do not have a direct connection or a connection via relay therebetween, the offline charging mode is used. When the user equipment and the wireless communication network have a connection, whether the offline charging mode or the online charging mode is used is determined according to, for example, a protocol between the operator of the wireless communication network and the user.

Next the UE-CTF generates a charging request for the proximity based service used by the user equipment based on the charging related information and the charging mode. When the charging mode is an offline charging mode, the UE-CTF transmits the charging request to the offline charging system of the wireless communication network; when the charging mode is an online charging mode, the UE-CTF transmits the charging request to the online charging system of the wireless communication network.

In one preferred embodiment, the UE-CTF may also determine to which charging system in the wireless communication network the charging request should be transmitted based on whether the user equipment is served by home public land mobile network (HPLMN). For example, when the user equipment in the mobile communication network is served by a non-HPLMN, and when the charging mode is an offline charging mode, the UE-CTF will transmit the charging request to the offline charging system in the non-HPLMN. When the user equipment in the mobile communication network is served by a non-HPLMN and when the charging mode is an online charging mode, the UE-CTF transmits the charging request to the online charging system in the HPLMN. When the user equipment in the mobile communication network is served by HPLMN and when the charging mode is an offline charging mode, the UE-CTF transmits the charging request to the offline charging system in the HPLMN. When the user equipment in the mobile communication network is served by HPLMN and when the charging mode is the online charging mode, the UE-CTF transmits the charging request to the online charging system in the HPLMN. Those skilled in the art should understand that the manner of determining to which charging system in the wireless communication network the charging request should be transmitted based on whether the user equipment is served by a HPLMN, as described here, is only exemplary, not limitative, and any manner suitable for the present invention should also be included within the protection scope of the present invention and is incorporated here by reference.

Figure 3:
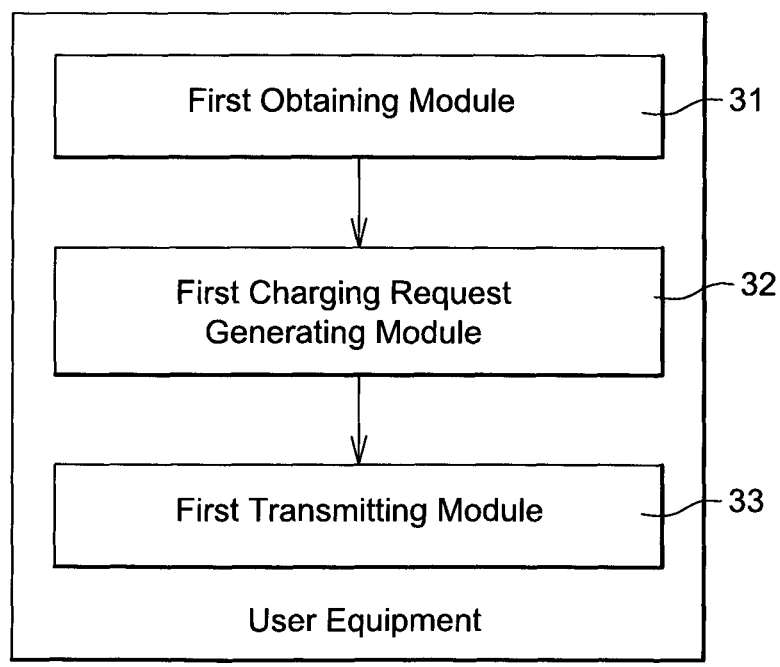
FIG. 3 shows a schematic diagram of a user equipment supporting charging a proximity based service in a wireless communication network according to embodiments in another aspect of the present invention.

FIG. 3 shows a schematic diagram of a user equipment supporting charging a proximity based service in a wireless communication network according to embodiments in another aspect of the present invention. The user equipment comprises means 31 (hereinafter referred to as "first obtaining module 31") for obtaining charging related information of the proximity based service used by the user equipment; means 32 for (hereinafter referred to as first charging request generating module 32) generating a charging request for the proximity based service used by the user equipment based on the charging related information; and means 33 (hereinafter referred to as first transmitting module 33) for transmitting the charging request to a charging system of the wireless communication network.

First, the first obtaining module 31 obtains charging related information of a proximity based service used by the user equipment. Specifically, since the first obtaining module 31 is located at the user equipment, when the user equipment uses the proximity based service, the first obtaining module 31 may obtain the corresponding charging related information through interaction with various relevant functions on the user equipment. Here, the first obtaining module 31 may obtain the charging related information at the start of the proximity based service, may also obtain the charging related information during the proximity based service, and may also obtain the charging related information at the end of the proximity based service.

In one embodiment, means 311 (not shown, hereinafter referred to as determining module 311), in the first obtaining module 31, for determining whether it is needed to obtain the charging related information of the proximity based service used by the user equipment, determines whether it is needed to obtain the charging related information of the proximity based service used by the user equipment, and only when it is determined to be needed, means 312 (not shown, hereinafter referred to as second obtaining module 312), in the first obtaining module 31, for obtaining the charging related information of the proximity based service used by the user equipment based on a result of determining, obtains the charging related information of the proximity based service used by the user equipment.

For example, when in the wireless communication network, besides the user equipment supports the above function of charging the proximity based service thereon, the network device also has a CTF that may be used to generate a charging request for the proximity based service. Since the scenario should be avoided that the user equipment and the CTF both generate a charging request for the charging related information, which would cause charging error, the determining module 311 in the user equipment needs to determine whether the charging related information of the proximity based service of the user equipment should be obtained so as to generate the charging request.

In one embodiment, the determining module 311 determines whether to obtain he charging related information of the proximity based service of the user equipment based on the network connection state and/or access type from the user equipment to the wires communication network, or through a predetermined condition. For example, when the user equipment does not have a connection to the wireless communication network, the determining module 311 determines to obtain corresponding charging related information; otherwise, the determining module 311 determines not to obtain the corresponding charging related information. In another embodiment, when the user equipment accesses the wireless communication network via a relaying node, the determining module 311 determines to obtain the corresponding charging related information; when the user equipment is located within the coverage of the wireless communication network so as to have a direct connection to the wireless communication network, then the determining module 311 determines not to obtain the corresponding charging related information. In another embodiment, the determining module 311 queries a predetermined condition and determines whether to obtain the corresponding charging related information based on the predetermined condition. For example, the predetermined condition may be that the corresponding charging related information is always obtained by the first obtaining module 31. Here, the predetermined condition may also be dynamically adjusted based on the actual needs.

In another embodiment, the determining module 311 determines whether to obtain the charging related information of a proximity based service used by the user equipment based on the service type and/or application type of the proximity based service. Here, the service type of the proximity based service includes an event type and a session type, and the session type includes a voice call session type and an application data flow session type. The application type refers to a type of the application using the proximity based service. For example, the determining module 311 determines to obtain the corresponding charging related information only when the service type of the proximity based service is a session type. For another example, the determining module 311 determines to obtain the corresponding charging related information only when the service type of the proximity based service is a session type, and the type of the application using the proximity based service is a non-public safety type.

In another embodiment, the determining module 311 determines whether to obtain the charging related information of the proximity based service used by the user equipment based on control information from the wireless communication network. For example, as mentioned above, in one embodiment, in the wireless communication network, besides the user equipment has the UE-CTF thereon, the network device also has a CTF that may be used to generate a charging request for the proximity based service. Usually, the user equipment and CTF should not generate a charging request simultaneously for the identical charging related information of the same proximity based service. When the user equipment and the wireless communication network have a direct connection or a connection via relay therebetween, the wireless communication network may determine it should be the user equipment or the CTF that performs charging processing to the proximity based service of the user equipment, and transmits corresponding control information to the CTF and the user equipment. Based on the control information from the wireless communication network, the determining module 311 can determine whether it should obtain the charging related information of the proximity based service used by the user equipment to generate a charging request.

Those skilled in the art should understand, here, the above manner in which the determining module 311 determines whether it is needed to obtain the charging related information of the proximity based service used by the user equipment is only exemplary, rather than limitative; any manner suitable for the present invention should also be included within the protection scope of the present invention and is incorporated here by reference. Moreover, those skilled in the art should understand that the determining module 311 here needs to determine to obtain corresponding charging related information is not only limited to the scenario where the wireless communication network further exists a CTF. The above method may be applicable to any scenario where the determining module 311 needs to perform the above determining.

Next, the first charging request generating module 32 generates a charging request for the proximity service used by the user equipment based on the charging related information. As mentioned above, the charging related information may contain the charging related information obtained at the start of the proximity based service, may also contain the charging related information obtained during the proximity based service, and may also contain the charging related information obtained at the end of the proximity based service. The first charging request generating module 32 may extract or generate necessary charging parameters from the obtained charging related information and include the corresponding charging parameters in the generated charging request. Here, the charging request may include one or more of the following:

- a charging identifier indicating a charged entity;
- information indicating that the charging request is generated by the user equipment;
- a sequence number indicating a sequence of the charging request;
- the charging related information.

Here, the charging identifier indicating a charged entity refers to information that may indicate a charged entity to which the charging request targets, e.g., it may be the information of a user account or an application. The information indicating that the charging request is generated by the user equipment means the first charging request generating module 32 may add the information into the charging request to indicate that the charging request is generated by the user equipment, i.e., the first charging request generating module 32. When t the CTF and the user equipment including the first charging request generating module 32 exist simultaneously in the wireless communication network, the indication information may distinguish the charging request generated by the first charging request generating module 32 and the charging request generated by the CTF. The sequence number for indicating a sequence of the charging request refers to, for example, for a charged session using the proximity based service, as mentioned above, the charging related information obtained by the first obtaining module 31 may include the charging related information obtained at the start of the session, during the session, and at the end of the session, such that the first charging request generating module 32 will correspondingly generate one or more charging requests. The first charging request generating module 32 uses the sequence number for indicating a sequence of a charging request to indicate the sequence of the generated charging request, such that after the charging request is transmitted to the charging system, the charging system may confirm the sequence of the charging request based on the sequence number, thereby avoiding charging error caused by inconsistency between the sequence of receiving the charging request and the sequence of transmitting due to for example network reason. Besides, the first charging request generating module 32 may also include the charging related information into the generated charging request.

Then, the first transmitting module 33 transmits the charging request to the charging system of the wireless communication network. When the user equipment and the wireless communication network have a direct connection or a connection via relay therebetween, the first transmitting module 33 transmits the charging request to the charging system of the wireless communication network via the connection. Besides, the first transmitting module 33 may also store the charging request. For example, when the user equipment temporarily does not have a connection with the wireless communication network, the first transmitting module 33 stores the charging request on the user equipment. When a direct connection or a connection via relay is established between the user equipment and the wireless communication network, the first transmitting module 33 sends the stored charging request to the charging system of the wireless communication network. In other words, the first transmitting module 33 may determine the time of transmitting the charging request to the charging system based on the network connection state from the user equipment to the wireless communication network.

Besides, in one embodiment, the first transmitting module 33 may also determine the time of transmitting the charging request to the charging system based on a first time threshold. For example, when the network is jammed, the first transmitting module 33 may transmit the charging request to the charging system after waiting for a time indicated by the first time threshold. Here, the first time threshold may be a value preset based on empirical value and the like, or it could be a range, such that the first transmitting module 33 may determine the desired time for waiting within this range for example according to a random principle. Besides, the first time threshold may also be passively adjusted according to the actual needs. Those skilled in the art should understand that, here, the manner of setting the first time threshold and determining the time of transmitting the charging request is only exemplary, not limitative, and any manner suitable for the present invention should also be included within the protection scope of the present invention and is incorporated here by reference.

In one embodiment, means 321 (not shown, hereinafter referred to a charging mode determining module 321), in the first charging request generating module 32, for determining a charging mode of the proximity based service, determines the charging mode of the proximity based service; moreover, means 322 (not shown, hereinafter referred to as a second charging request generating module 322) in the first charging request generating module, for generating a charging request for the proximity based service used by the user equipment based on the charging related information and the charging mode, generates a charging request for the proximity based service used by the user equipment. Moreover, means 331 (not shown, hereinafter referred to as a second transmitting module 331), in the first transmitting module 33, for transmitting charging request to an offline charging system or online charging system of the wireless communication network based on the charging mode, transmits the charging request to the offline charging system or online charging system of the wireless communication network based on the charging mode.

Specifically, the charging mode determining module 321 first determines the charging mode of the proximity based service. Here, the charging mode includes an offline charging mode and an online charging mode. For example, when the user equipment and the wireless communication network do not have a direct connection or a connection via relay therebetween, the offline charging mode is used. When the user equipment and the wireless communication network have a connection, the charging mode determining module 321 may determine whether to use the offline charging mode or the online charging mode according to, for example, a protocol between the operator of the wireless communication network and the user.

Next the second charging request generating module 322 generates a charging request for the proximity based service used by the user equipment based on the charging related information and the charging mode. When the charging mode is an offline charging mode, the second transmitting module 331 transmits the charging request to the offline charging system of the wireless communication network; when the charging mode is an online charging mode, the second transmitting module 331 transmits the charging request to the online charging system of the wireless communication network.

In one preferred embodiment, the second transmitting module 331 may also determine to which charging system in the wireless communication network the charging request should be transmitted based on whether the user equipment is served by a home public land mobile network (HPLMN). For example, when the user equipment in the mobile communication network is served by a non-HPLMN, and when the charging mode is an offline charging mode, the second transmitting module 331 will transmit the charging request to the offline charging system in the non-HPLMN. When the user equipment in the mobile communication network is served by a non-HPLMN and when the charging mode is an online charging mode, the second transmitting module 331 transmits the charging request to the online charging system in the HPLMN. When the user equipment in the mobile communication network is served by HPLMN and when the charging mode is an offline charging mode, the second transmitting module 331 transmits the charging request to the offline charging system in the HPLMN. When the user equipment in the mobile communication network is served by HPLMN and when the charging mode is the online charging mode, the second transmitting module 331 transmits the charging request to the online charging system in the HPLMN. Those skilled in the art should understand that the manner of determining to which charging system in the wireless communication network the charging request should be transmitted based on whether the user equipment is served by HPLMN, as described here, is only exemplary, not limitative, and any manner suitable for the present invention should also be included within the protection scope of the present invention and is incorporated here by reference.

Figure 4:
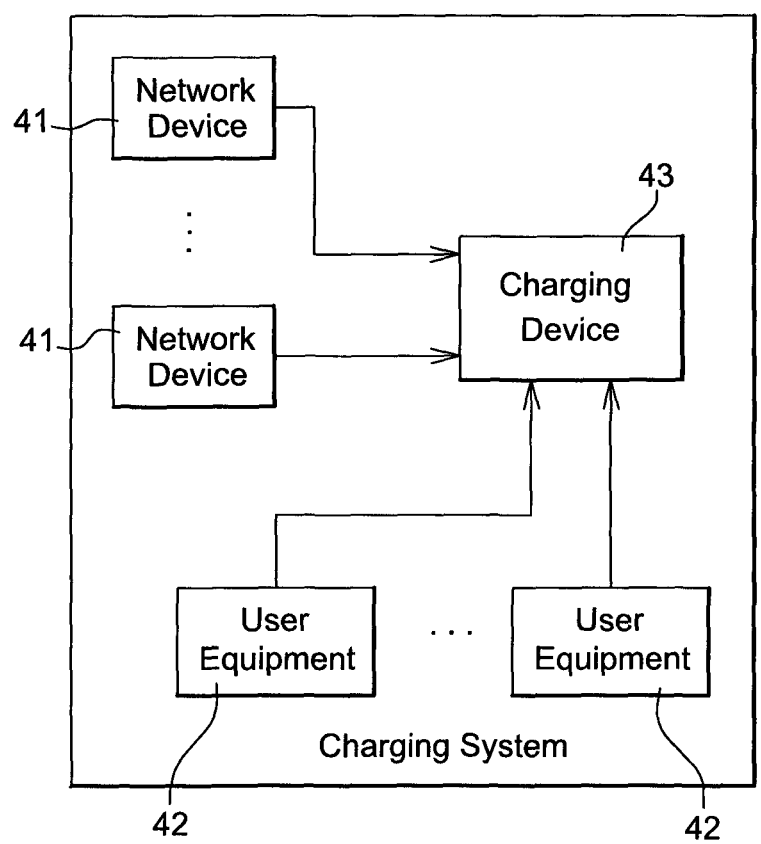
FIG. 4 shows a schematic diagram of a charging system for a proximity based service in a wireless communication network according to a further aspect of the present invention.

FIG. 4 shows a schematic diagram of a charging system for a proximity based service in a wireless communication network according to a further aspect of the present invention. As shown in FIG. 4, the charging system comprises a network device 41, in the wireless communication network, for generating and transmitting a charging request for a proximity based service used by a user equipment, a user equipment 42 supporting the method of charging a proximity based service in the wireless communication network, and a charging device 43 for charging based on the charging request.

The network device 42 here may be an individual device or a device integrated with other functions.

Herein, the charging system can control a network device 41 and a user equipment 42 to generate a proximity based service used by the user equipment and transmit a charging request. In one embodiment, the charging system may decide it is the network device 41 or the user equipment 42 that performs the generation and transmits the charging request based on a predetermined rule. For example, when the user equipment has a direct connection or a connection via route to the wireless communication network, it is the network device 41 that generates the proximity based service used by the user equipment 42 and transmits the charging request; when the user equipment 42 and the wireless communication network do not have a connection, it is the user equipment 42 that generates the proximity based service used by itself and transmits the charging request. In another embodiment, the charging system may also dynamically transmit control information to the network device 41, and when the user equipment 42 has a connection with the wireless communication network, the charging system may also dynamically transmit control information to the user equipment 42, such that the charging system can dynamically control the network device 41 and the user equipment 42 so that either the network device 41 or the user equipment 42 performs the generation and transmits the charging request, but they do not perform the generation or transmit the charging request simultaneously.

Besides, in one embodiment, when the network device 41 and the user equipment 42 jointly generate the charging requests for the proximity based service used by the user equipment 42, the network device 41 and the user equipment 42 synchronize the sequence number of the sequence of the charging request. As mentioned above, the charging request may contain a sequence number indicating its sequence, and the charging system may determine the sequence of the received plurality of charging requests based on the sequence numbers of the charging request. When for the same proximity session, the network device 41 and the user equipment 42 generate charging requests for its different phases, it is needed to determine that the sequence numbers of the charging requests generated by the two maintain a sequential order.

For example, when a user equipment 42 (denoted as user equipment 421), during using a proximity based service, moves from a coverage of the wireless communication network to outside of the coverage of the wireless communication network and does not have a connection to the wireless communication network anymore, since another user equipment 42 (denoted as user equipment 422) performing a proximity session with the user equipment 421, also moves correspondingly, the two user equipments 421 and 422 keep proximity, and the proximity session is continued during this moving process. Further illustration will be made with user equipment 421 as an example. In this example, when the user equipment 421 is located within the coverage of the wireless communication network, it is the network device 41 that generates the proximity based service used by the user equipment 421 and transmits a charging request. However, when the user equipment 421 moves out of the coverage of the wireless communication network, it is the user equipment 421 that generates the proximity based service used by itself and transmits a charging request. Therefore, in this example, the sequence number of the charging request generated by the user equipment 421 should be larger than the sequence number generated by the network device 41.

In one instance, after generating a charging request to a certain proximity based service, the network device 41 informs the sequence number of the current charging request to the user equipment 42 such that when it is needed to continue generation of a charging request for the same proximity based service, the user equipment 42 may start to continue generation of the charging request from the largest sequence number among the received sequence numbers of the proximity based service. On the other hand, after the user equipment 42 generates a charging request for a certain proximity based service, if the user equipment has a connection to the wireless communication network, then the user equipment informs the sequence number of the current charging request to the network device 41; or if the user equipment 42 does not have a connection to the wireless communication network, the user equipment 42 stores the sequence number of the current charging request, and after the user equipment 42 is connected to the wireless communication network, the user equipment 42 will informs the largest value among the sequence numbers of the charging requests for the proximity based service to the network device 41, such that when the network device 41 needs to continue generation of a charging request for this proximity based service; generation of the charging request may be continued from the largest value of the received sequence numbers of the charging requests for the proximity based service. In this way, the network device 41 and the user equipment 42 can synchronize the sequence numbers indicating of the sequences of the charging requests. Those skilled in the art should understand that, here, the manner in which the network device and the user equipment synchronize the sequence numbers is only exemplary, not limitative, and any manner suitable for the present invention should also be included within the protection scope of the present invention, and is incorporated hereby reference.

It should be noted that the present invention may be implemented in software and/or a combination of software and hardware. For example, each module of the present invention may be implemented by an application-specific integrated circuit (ASIC) or any other similar hardware device. In one embodiment, the software program of the present invention may be executed through a processor to implement the steps or functions as mentioned above. Likewise, the software program (including relevant data structure) of the present invention may be stored in a computer readable recording medium, e.g., RAM memory, magnetic or optic driver or soft floppy or similar devices. Additionally, some steps or functions of the present invention may be implemented by hardware, for example, a circuit cooperating with the processor so as to implement various steps of functions.

Additionally, a part of the present invention may be applied as a computer program product, e.g., a computer program instruction, which, when being executed by the computer, may invoke or provide a method and/or technical solution according to the present invention. Further, the program instruction invoking the method of the present invention may be stored in a fixed or mobile recording medium, and/or communicated through broadcast or data stream in other signal carrying media, and/or stored in a work memory of a computer device running based on the program instruction. Here, one embodiment according to the present invention comprises an apparatus that includes a memory storing the computer program instruction and a processor executing the program instruction, wherein when being executed by the processor, the computer program instruction triggers the apparatus to operate the method and/or technical solution according to a plurality of embodiments of the present invention as mentioned above.

To those skilled in the art, it is apparent that the present invention is not limited to the details of the above exemplary embodiments, and the present invention may be implemented with other embodiments without departing from the spirit or basic features of the present invention. Thus, in any way, the embodiments should be regarded as exemplary, not limitative; the scope of the present invention is limited by the appended claims, instead of the above depiction. Thus, all variations fell into the meaning and scope of equivalent elements of the claims intended to be covered within the present invention. No reference signs in the claims should be regarded as limiting the involved claims. Besides, it is apparent that the term "comprise" or "include" does not exclude other units or steps, and singularity does not exclude plurality. A plurality of units or modules stated in a system claim may also be implemented by a single unit or module through software or hardware. Terms such as the first and the second are used to indicate names, but do not indicate any particular sequence.

The invention claimed is:

1. A method for charging for use of a proximity based service by a user equipment (UE) of a wireless communication network, wherein use of the proximity based service includes direct communication between UEs in proximity of each other using local radio resources, the method comprising:
   determining, by the UE, whether obtaining charging related information for use of the proximity based service by the UE is required based on at least one of,
      a state of a network connection from the UE to the wireless communication network,
      a type of access from the UE to the wireless communication network,
      a predetermined condition,
      a service type of the proximity based service,
      a type of application using the proximity based service, and
      control information received from the wireless communication network; and
   in response to the UE determining that obtaining the charging related information is required,
      obtaining, by the UE, the charging related information for use of the proximity based service by the UE;
      determining, by the UE, a charging mode for use of the proximity based service by the UE, including determining whether to use an offline charging mode or an online charging mode;
      generating, by the UE, a charging request for use of the proximity based service by the UE based on the obtained charging related information and the determined charging mode; and
      transmitting, by the UE, the charging request to an offline charging system or an online charging system of the wireless communication network according to the determined charging mode.

2. The method according to claim 1, wherein the transmitting the charging request to an offline charging system or online charging system of the wireless communication network according to the determined charging mode comprises:
   when the UE in the wireless communication network is served by a non-home public land mobile network and the charging mode is determined to be the offline charging mode, transmitting the charging request to an offline charging system in the non-home public land mobile network;
   when the UE in the wireless communication network is served by the non-home public land mobile network and the charging mode is determined to be the online charging mode, transmitting the charging request to an online charging system in the non-home public land mobile network;

when the UE in the wireless communication network is served by a home public land mobile network and the charging mode is determined to be the offline charging mode, transmitting the charging request to an offline charging system in the home public land mobile network; and when the UE in the wireless communication network is served by the home public land mobile network and the charging mode is determined to be the online charging mode, transmitting the charging request to an online charging system in the home public land mobile network.

3. The method according to claim 1, wherein the transmitting the charging request to an offline charging system or an online charging system of the wireless communication network further comprises:

determining a time for transmitting the charging request to the offline charging system or the online charging system based on at least one of the state of the network connection from the UE to the wireless communication network and a first time threshold.

4. The method according to claim 1, wherein the charging related information comprises any one or more of the following:

charging related information obtained at the start of the proximity based service;

charging related information obtained during the proximity based service; and charging related information obtained at the end of the proximity based service.

5. The method according to claim 1, wherein the charging request comprises any one or more of the following:

a charging identifier indicating a charged entity;

information indicating that the charging request is generated by the UE;

a sequence number indicating a sequence of the charging request; and said charging related information.

6. A user equipment (UE) of a wireless communication network supporting charging for use of a proximity based service by the UE, wherein use of the proximity based service includes direct communication between UEs in proximity of each other using local radio resources, the UE comprising:

a memory configured to store computer-readable instructions; and a processor configured to execute the computer-readable instructions to, determine whether obtaining charging related information for use of the proximity based service by the UE is required based on at least one of, a state of a network connection from the UE to the wireless communication network, a type of access from the UE to the wireless communication network, a predetermined condition, a service type of the proximity based service, a type of application using the proximity based service, and control information received from the wireless communication network; and in response to the UE determining that obtaining the charging related information is required, obtain the charging related information for use of the proximity based service by the UE;

determine a charging mode for use of the proximity based service by the UE, including determining whether to use an offline charging mode or an online charging mode;

generate a charging request for use of the proximity based service by the UE based on the obtained charging related information and the determined charging mode; and transmit the charging request to an offline charging system or an online charging system of the wireless communication network according to the determined charging mode.

7. The UE according to claim 6, wherein the processor is configured to execute the computer-readable instructions to:

when the UE in the wireless communication network is served by a non-home public land mobile network and the charging mode is determined to be the offline charging mode, transmit the charging request to an offline charging system in the non-home public land mobile network;

when the UE in the wireless communication network is served by the non-home public land mobile network and the charging mode is determined to be the online charging mode, transmit the charging request to an online charging system in the non-home public land mobile network;

when the UE in the wireless communication network is served by a home public land mobile network and the charging mode is determined to be the offline charging mode, transmit the charging request to an offline charging system in the home public land mobile network; and when the UE in the wireless communication network is served by the home public land mobile network and the charging mode is determined to be the online charging mode, transmit the charging request to an online charging system in the home public land mobile network.

8. The UE according to claim 6, wherein the processor is further configured to execute the computer-readable instructions to:

determine a time for transmitting the charging request to the offline charging system or the online charging system based on at least one of the state of the network connection from the UE to the wireless communication network and a first time threshold.

9. The UE according to claim 6, wherein the charging related information comprises any one or more of the following:

charging related information obtained at the start of the proximity based service;

charging related information obtained during the proximity based service; and charging related information obtained at the end of the proximity based service.

10. The UE according to claim 6, wherein the charging request comprises any one or more of the following:

a charging identifier indicating a charged entity;

information indicating that the charging request is generated by the UE;

a sequence number indicating a sequence of the charging request; and said charging related information.

11. A charging system for a proximity based service in a wireless communication network, comprising:

a network device in the wireless communication network configured to generate and transmit a charging request for use of the proximity based service by a user equipment (UE) supporting the method according to claim 1; and a charging device configured to charge for use of the proximity based service by the UE based on the charging request.

12. The charging system according to claim 11, wherein the charging system is configured to control the network device and the UE to generate the proximity based service used by the UE and transmit the charging request.

13. The charging system according to claim 12, wherein the network device and the UE are configured to determine which one of the network device and the UE is required to generate and transmit the charging request based on a predetermined rule, such that the network device and the UE do not generate and transmit the charging request simultaneously.

14. The charging system according to claim 11, wherein when the network device and the UE jointly generate the charging requests for use of the proximity based service by the UE, the network device and the UE are configured to synchronize sequence numbers indicating a sequence of the charging requests.

* * * * *